E. C. WOODRUFF.
SYSTEM OF MOTOR CONTROL.
APPLICATION FILED JAN. 17, 1914.
1,136,195.
Patented Apr. 20, 1915.
2 SHEETS—SHEET 1.
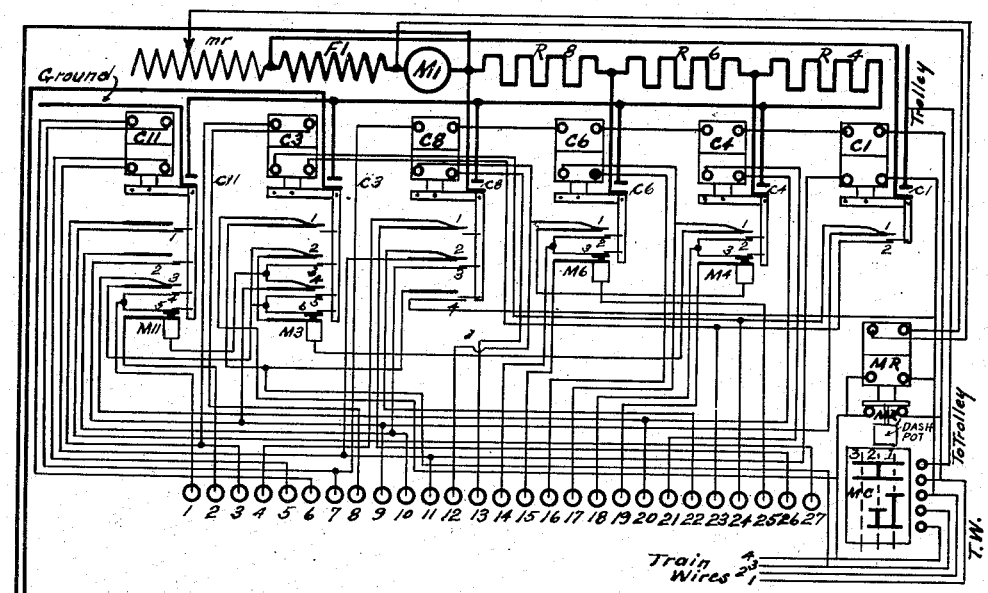
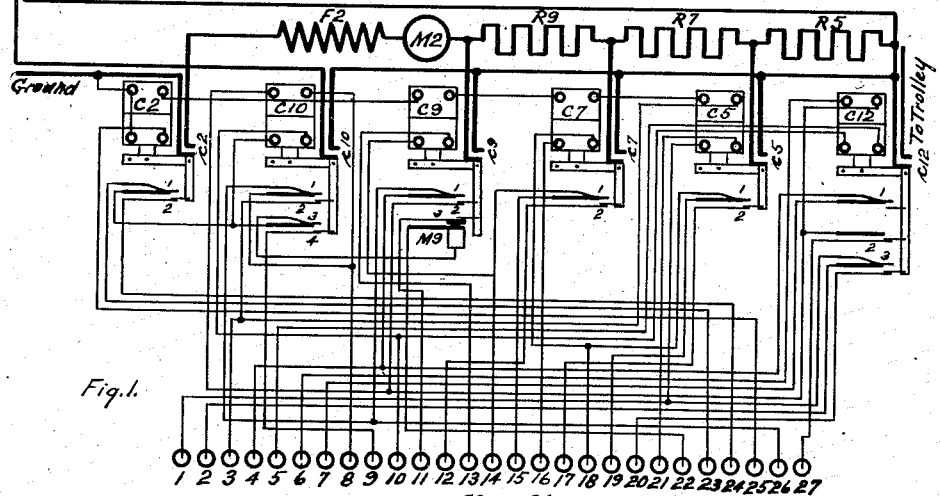
Fig.1.
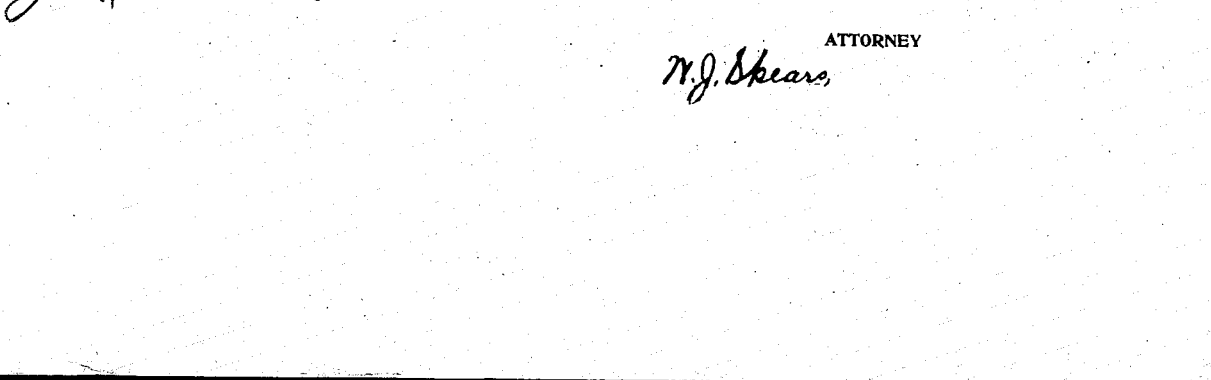
Fig.4.
WITNESSES
Geo. F. Eckhard.
J. O. Kammerman
INVENTOR
Eugene C. Woodruff
BY
ATTORNEY
N. J. Shears, E. C. WOODRUFF.
SYSTEM OF MOTOR CONTROL.
APPLICATION FILED JAN. 17, 1914.
1,136,195.
Patented Apr. 20, 1915.
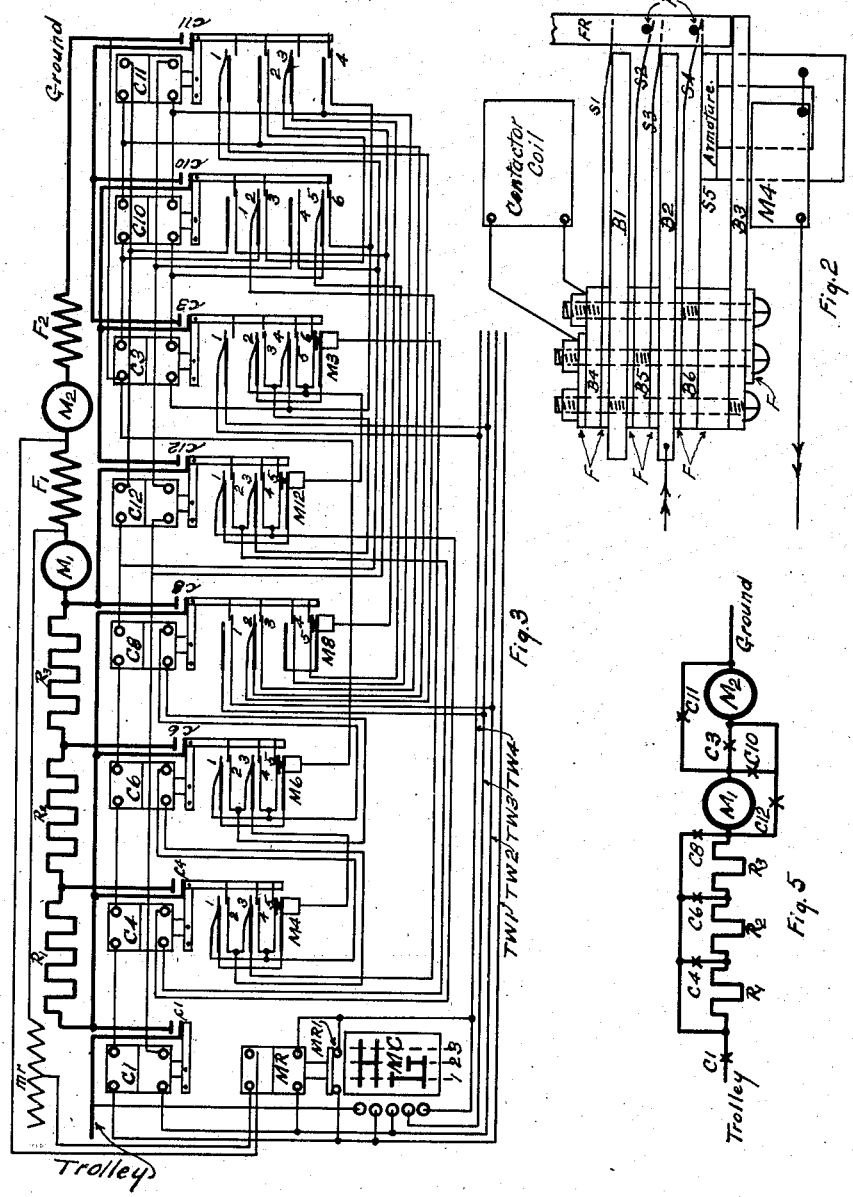
WITNESSES
Geo. F. Eckhard.
J. O. Kammerman
INVENTOR
Eugene C. Woodruff
BY
ATTORNEY
W. J. Spears

UNITED STATES PATENT OFFICE.

EUGENE C. WOODRUFF, OF STATE COLLEGE, PENNSYLVANIA.

SYSTEM OF MOTOR CONTROL.

1,136,195.  Specification of Letters Patent.  Patented Apr. 20, 1915.

Application filed January 17, 1914. Serial No. 812,718.

*To all whom it may concern:*

Be it known that I, EUGENE CYRUS WOODRUFF, a citizen of the United States, and a resident of State College, in the county of Center and State of Pennsylvania, have invented a System of Motor Control, of which the following is a full, clear, and exact description, reference being had to the accompanying drawings, forming part of this specification, in which—

Figure 1 is a diagram of an apparatus embodying my invention. Fig. 2 is a detail view showing in simple form the construction and operation of a typical interlock. Fig. 3 is a diagram showing a modification of my invention. Fig. 4 shows the motor circuits for Fig. 1 in a simple form. Fig. 5 shows in a similar manner the motor circuits for Fig. 3.

In Fig. 1 the apparatus is shown in connection with the train line of the multiple unit system of train control which is described and claimed in the patent of Frank J. Sprague, Number 660065. The modification shown in Fig. 3 is shown with a similar train line.

My purpose is to provide a control apparatus in which the motors are controlled by automatic successively-acting contact devices. The apparatus in its best form has the following characteristics, which, in combination, I believe to be new, and some of which are also individually new. They render the control automatic, positive, and safe, and cheapen the cost of construction and maintenance.

Leading characteristics of the invention are:—

First:—Contact devices or power actuated switches are automatically operated in succession through a cycle of steps wherein the positiveness of the order of events is not a function of a time element of any auxiliary controlling device, such for instance as the sticking of a relay.

Second:—Provision is made to secure the automatic progression of the unit switches or contactors so as to place the motors first in series and then in parallel with the proper resistance steps up to the point corresponding to the setting of the master controller, which may be the full multiple setting or any other short of that.

Third:—The speed of progression of the unit switches is a function of the motor current, i. e. successive operations take place only when the motor current is at or below a certain predetermined value, which critical value, however, may be varied by the motorman so as to secure acceleration of the car at different rates as may be required by the exigencies of the train schedule.

Fourth:—Provision is made whereby it is insured that the successive operations of the unit switches shall occur not only in the proper order, but that each succeeding operation of the system of contactors, automatic or otherwise, shall wait for a corresponding operation of a master relay, automatic or otherwise, even if the action of said master relay, and its auxiliary arresting magnets, may be delayed by low voltage, friction, or imperfect adjustments.

Fifth:—Each operating magnet is wound with two coils, one of which acts as a holding coil, both together as lifting coils when excited in electromagnetic conjunction, and both together when excited in opposition allow gravity or a controlling spring to open the switch. Each magnet, in general, is operated by the interlocking contacts on the previously operated magnet or magnets, first short-circuiting and then reversing one of its coils so as to change the magnetic fields of the coils from opposition to conjunction or vice versa. When in opposition the coils of the idle magnets also serve as series resistances for the other magnets, thereby accomplishing the following:—

Sixth:—The actuating coils of the unit switches are so connected as to form but two circuits across the line voltage at any time, eliminating substitutional resistances, cheapening the winding by reducing the drop across individual coils, simplifying the wiring, minimizing the number of series resistances, and economizing in operating energy.

Seventh:—The double wound coils have a sharpness and positiveness of action coupled with an economy of electrical energy during the maintaining of any particular step in the sequence, since both coils of a contactor are used to close or open it, both circuits being excited, while for part or all of the time as desired but one circuit need be excited to hold the contactors in any particular combination.

Eighth:—The interlocking contacts are so constructed out of flat strips of metal and fiber, and are so assembled as to secure simplicity, rigidity, and permanence of adjustment and alinement, to cheapen the construction, and to facilitate repair. The assembling is such as to reduce the wiring to a minimum.

Ninth:—The construction of the master relay is such that the travel of the contact-breaking plunger begins and finishes in each direction at a comparatively high speed, but with a slow motion in between, thereby breaking the operating circuit with an abruptness that preserves the contacts from burning, and at the same time giving the unit switches plenty of time to open or close before the master relay completes its stroke.

Tenth:—The auxiliary arresting magnets, used in connection with the master relay, divide the cycle of the contactors into positive definite steps, and make it possible to halt the progression after any number of steps have taken place as a sub-group, or to proceed through the cycle with a pause between each step and the next.

The arrangement of the circuits and switches shown in Fig. 1 and the abbreviations used in the description of the operations are as follows:—M1 and M2 are the motor armatures with their respective fields F1 and F2. The heavy lines show the motor circuits and the light lines the control circuits. For simplicity the device for reversing the motors is omitted from all the diagrams. Said reverser may be any convenient device known to those skilled in the art, suitably interlocked with the control circuits of the unit switches in any of the well known ways. C4, C6, C8, C5, C7, and C9 are electromagnets operating the main contacts, $c4$, $c6$, $c8$, $c5$, $c7$, and $c9$, by means of plungers and levers. These main contacts shunt resistances, R4, R6, R8, R5, R7, and R9 respectively, in the main motor circuits. C1 and C12 are similar electromagnets operating the main contacts $c1$ and $c12$, which contacts connect the motors, M1 and M2, and their resistances to the source of current, while C11 and C2 operate contacts connecting the motors to the ground side of the line. Magnet C3 connects the motors in series, while magnet C10 bridges across from one motor circuit to the other during the transition from series to parallel connection of the motors. All of these contactor magnets, or unit switches, are wound with two coils and are so adjusted that neither coil alone can close the contactor, though either alone will hold it closed after both coils excited in conjunction have operated the switch, while both coils excited in opposition will have so small a net magnetic field that the switch, if closed, will be opened by gravity, springs, or other convenient means. Each contactor of course has a magnetic blow-out at its main contact of the conventional type, but not shown in the diagrams for simplicity. Fig. 4 shows in a simple diagram this arrangement of switch contacts, motors, and resistances, omitting the winding of the electromagnet coils and the control circuits thereof.

Besides controlling the main contacts above noted, each contactor by means of an operating rod fastened to the main contact lever controls a series of small contacts or interlocks, numbered 1, 2, 3, etc., for each contactor, and to be hereinafter designated thus: $4c3$ means interlock contact 4 on contactor 3, etc. These interlocks are in the control circuits of the contactors. The upper coils of the magnets are in what may be called a "holding circuit," and will be designated as HC9, etc., meaning upper or holding coil of contactor number 9. Similarly LC8 will mean lower of lifting coil of contactor number 8, etc., the lower coils of the contactors being in what may be called a "lifting circuit." MR is an electromagnetic master relay also wound with two coils, HMR and LMR, LMR being in the contactor lifting circuit or in shunt therewith, while HMR is shunted across one of the motor fields. The function of LMR is to periodically make and break the circuits that include the lifting coils of the contactors, the auxiliary magnets, and LMR itself at contact LMR1, at a rate controlled by a dash pot or other equivalent device, thereby causing the main switch group to pass through its cycle of operations in distinct steps in accelerating the motors. The function of HMR is to arrest the action of MR whenever the motor current rises above a predetermined value, and later to allow the action to resume when the current has fallen below that value through the speeding-up of the motors. In the circuit of HMR is an adjustable resistance, $mr$, by altering which resistance the motorman can change the value of the motor current at which the successive steps of the main control will be taken, and thereby adjust the rate of acceleration of the car to suit the special needs of the schedule.

MC is the master controller by which the control circuits are operated. There may be as many of these in the car or in the train as is desired, any one of which may be used to control the system.

TW are the train wires which would have the usual couplers, cut-outs, etc., as needed, whereby a number of motor cars in a train may be operated from any master controller on any car. These couplers, etc., are omitted from the diagrams for simplicity as their construction and operation would be of a conventional well known character independent of the special features of my invention.

M4, M6, etc., are small auxiliary arresting magnets in a circuit controlled by the master relay. Their function is to arrest the progression of the main switch system so that each step thereof will be separated from the next by a stroke of the master relay. In the form of my system of control herein shown these auxiliary magnets control the main magnets electrically, but such control may be made through a purely mechanical connection, such as a trigger action, or in many other ways as will be obvious to one skilled in the art. 1, 2, 3, 4, . . . 27, are terminals on the two halves of the control, so drawn and constructed for convenience only. In assembling the control these terminals are provided with contact springs so that the 27 of one-half of the control connect electrically with the 27 of the other half. In tracing out the circuits such connection is to be assumed in the drawing. The wires to and from these terminals will be designated as $w1$, $w2$, $w3$, etc. Of course when the control is constructed in one section these terminals and springs are not used but the wires are run direct.

The operation of the form of my invention shown in Fig. 1 is as follows: Two control circuits established by placing the master controller in its first or "switching position" are as follows:

(1)—A "holding circuit" from trolley to ground as follows: trolley—MC—TW1—reverser.—HC1—HC4—HC6—HC8.—$w7$—$1c$ 12—$1c9$—$1c10$—$w8$—HC3.—HC5—HC7—HC9—HC2—ground. This leaves HC10, HC11, and HC12 unexcited, being shunted by the interlocks.

(2)—A "lifting circuit" from trolley to ground as follows: trolley—MC—TW1—MR—TW4—TW2—LC1—$w11$—$3c9$—M9—$3c10$—$1c2$—$w23$—LC3—$1c1$—$4c3$—M11—$w2$—$3c12$—LC5—$w21$—LC4—$3c11$—$2c3$—M3—$1c4$—LC6—$w16$—LC7—$w18$—$3c4$—M4—$1c6$—LC8—$w13$—LC9—$w14$—$3c6$—M6—$w25$—LC2—ground. This leaves LC10, LC11, and LC12 unexcited, being shunted by interlocks, while LMR is shunted by the connecting of TW2 with TW4. Thereupon C1 and C2 close, their coils being in magnetic conjunction. The other seven contactors remain open as their coils are in opposition. As soon however as C1 and C2 raise their interlocks the part of the above lifting circuit ($1c2$—$w23$—LC3—$1c1$) is changed to ($2c2$—$w24$—LC3—$2c1$). This reverses the current in LC3 placing the coils of C3 in conjunction, and contactor 3 then closes, placing the motors in series with all resistance in. The closing of C3 by means of its interlocks changes the part of the lifting circuit ($4c3$—M11—$5c11$—$w1$—LC5—$w21$—LC4—$3c11$—$2c3$—M3) to ($5c3$—$3c11$—LC4—$w21$—LC5—$w1$—$5c11$—M11—$3c3$—M3). This reverses the current in LC4 and LC5, placing the coils of C4 and C5 in conjunction. C4 and C5, however, do not lift as yet, since the closing of C3 created a parallel shunting circuit, ($5c3$—$6c3$—M3), and LC4 and LC5 are thereby short-circuited. This condition of affairs maintains as long as MC is on the switching position and TW2 and TW4 short circuit LMR, leaving MR1 closed and the auxiliary magnets alive. The auxiliary magnet on contactor 3, M3, holds contact $6c3$ closed. The strength of the auxiliary magnets is such that they hold their armatures firmly when alive, but if the armature is once released by the breaking of the circuit and the corresponding contactor is closed, raising its interlocks, the reëstablishing of the auxiliary magnet circuit does not allow the auxiliary magnets to again close their armature contacts. Such closing is accomplished at a suitable time mechanically by the interlock operator of the corresponding contactor when said contactor opens. Now if MC is shifted to position 2, or "series position", TW2 and TW4 no longer shunt LMR, MR lifts, opening MR1 and breaking the lifting circuit and also the circuit of the auxiliary magnets, causing M3 to allow $6c3$ to open. Now if the motor current is above a certain value HMR holds MR1 open and the *status quo* is maintained until the rise in speed of the motors has reduced the motor current below the critical value. Thereupon HMR allows MR1 to close, reëstablishing the contactor lifting circuit but with $6c3$ open. Thereupon C4 and C5 close, shunting out the motor resistances R4 and R5, and by lifting their interlocks changing the part of the lifting circuit (M3—$1c4$—LC6—$w16$—LC7—$w18$—$3c4$—M4) to (M3—$2c4$—$w18$—LC7—$w16$—LC6—$w17$—$2c5$—M4). This reverses the current in LC6 and LC7, placing the coils of C6 and C7 in conjunction respectively, but at the same time establishing a shunting circuit (M3—$2c4$—$3c4$—M4). As before, in the action of the interlocks of C3, this shunting circuit prevents further progression until LMR opens MR1, causing M4 to release $3c4$, and HMR, when the motor current is small enough, allows MR1 to be reëstablished, energizing the lifting circuit but with the above short circuit removed. Thereupon C6 and C7 close, shunting out motor resistances R6 and R7, and controlling through their interlocks C8 and C9 just as C4 and C5 controlled C6 and C7. When C8 and C9 have closed the motors are in series with all resistances shunted out, and if the master controller is in the series position the part of the lifting circuit (MR1—LMR—LC1) is shunted by (MR1—TW4—TW3—$4c8$—LC1) through the action of MC and interlocks on C8, thereby shunting LMR and arresting further progression. Now if MC is shifted to the third, or "parallel position", the shunt on LMR is broken and MR opens the auxiliary magnet circuit at MR1. This allows M9 to release $3c9$, and when HMR allows MR to reëstablish the lifting circuit the part of the lifting circuit (LC1—w11—3c9—M9—5c10—2c2) becomes (LC1—3c8—w10—LC10—2c2) through the action of the interlocks on C8 and C9. Similarly the part of the holding circuit (1c12—1c9—2c10—w18) becomes (1c12—2c9—HC10—w8). Contactor C10 is now wholly energized and closes, bridging the motor circuits as per diagram 4. Thereupon the transition from motors in series with no resistances to motors in parallel with resistances in circuit is accomplished as follows: The closing of C10 raises its interlocks so that the part of the holding circuit (HC10—w8—HC3—HC5) is shunted by (HC10—3c10—w3—HC5), thereby deënergizing HC3; and the part of the lifting circuit (LC10—2c2—w24—LC3—2c1—5c3) is shunted by (LC10—6c10—w9—5c3), thereby deënergizing LC3. Thereupon C3 opens, its interlocks reverse LC4 and LC5, placing the coils of C4 and C5 in opposition so that C4 and C5 open, and in a similar manner C4 and C5 cause C6 and C7 to open, and C6 and C7 cause C8 and C9 to open. This removes the shunts from all the motor resistances but does not as yet place them in circuit as they are bridged out by C10 holding c10 closed. The opening of C8 changes the part of the lifting circuit (LC1—3c8—w10—LC10) to (LC1—LC11—w5—LC12—LC10), energizing LC11 and LC12. The opening of C9 changes the part of the holding circuit (HC8—w7—1c12—2c9—HC10) to (HC8—HC11—w6—HC12—HC10), energizing HC11 and HC12. Thereupon C11 and C12 close, connecting M1 and resistances to the ground and M2 and resistances to the trolley respectively. The closing of C11 and C12, through their interlocks, changes the part of the holding circuit (HC12—HC10—3c10—w3—HC5) to (HC12—2c12—1c11—w3—HC5), thereby permanently shunting out both HC10 and HC3. Similarly the part of the lifting circuit (LC12—LC10—6c10—w9—4c3) becomes (LC12—w10—2c11—4c3), permanently shunting out both LC10 and LC3. C10 is now wholly deënergized, opens, and the transition from series to parallel is complete.

The resistance steps in parallel are accomplished similarly to the corresponding steps in series, subject at each step to the control of the master relay and the auxiliary magnets. The interlocks on C11 and C12 reverse LC4 and LC5 so that C4 and C5 close, and thereafter C4 and C5 control C6 and C7, and C6 and C7 control C8 and C9 just as in the series steps. Finally when the motors are in parallel with all resistances shunted out, interlocks on C3 and C8 connect TW2 with TW4 thereby shunting out LMR and causing MR1 to remain closed during the free running of the motors. If at any time during the progression of the control MC is moved back to the first position, LMR is shunted by TW2 and TW4 and the progression is arrested until MC is shifted forward again. These operations all take place on all cars of the train in the same way, the speed of notching-up on each car being subject to the adjustment of its own master relay, and therefore to its own motor current. If the master controller is thrown clear to the third position at the start, or at any time after any number of steps, without pausing at the intermediate positions, the system will step up automatically to the full parallel position of the motors through all the above steps, subject only to the rise in speed of the motors and the adjustment of the master relay, each step in the cycle being taken automatically at the moment when a predetermined electrical and mechanical condition of affairs is reached that makes another step suitable. In the operation as described above when the progression is halted by shunting LMR, both lifting and holding circuits remain excited and the contactors remain open or closed according as their coils are in opposition or conjunction. However, the progression may be stopped by making the excitation of LMR independent of MR1. Then LMR will hold MR1 open and the lifting circuit broken until MC is shifted, and the contactors will remain open or closed with only the holding circuit excited, just as they were when the lifting circuit was broken. The first method of controlling MR is preferable for notching-up to full or half speed, while the second is suitable for prolonged running at any particular speed, being slightly more economical of electrical energy. However either may be used all the time to the exclusion of the other, or each may be used for that part of the progression for which it is best suited without affecting the principle of my invention.

The arrangement shown in Fig. 1 uses the so-called bridging method of transition from series to parallel connection of the motors. However, my invention is equally well adapted to accomplishing transition by any of the well known methods, such for instance as the shunting of one motor after placing resistances back in ɔ circuit, then opening the shunted motor's circuit and reconnecting the motor in parallel with the other motor. This method is especially suited for small and medium sized motors such as are used in city car operation, and gives a control smaller, lighter, simpler, and cheaper than the bridging type without sacrificing any of the automatic features or any of the flexibility of control thereof by the motorman. This form of my invention is shown in Fig. 3. The labels in Fig. 3 are similar to those in Fig. 1 and the abbreviations used in the description will have the same meaning. Contactor C1 connects the motors and resistances to the trolley. C4, C6 and C8 shunt out resistances R1, R2, and R3 respectively. C3 connects the motors in series. C10 acts the same as C3 during the first part of the transition from series to parallel. C11 and C12 connect the motors in parallel by connecting motor 1 to ground and motor 2 to the trolley through the resistances respectively. By omitting the main contact on C10 another method of transition results wherein the motor circuit is broken by C3 during the transition steps. In this latter method a slightly simpler interlocking of C10, C11, C12, and C3 may be used when desired.

The operation of Fig. 3 is as follows: Placing the master controller in the third, or full parallel, position establishes the following control circuits:—(1)—A holding circuit as follows:—trolley—MC—TW1—HC1, HC4, HC6, HC8, 1c11—2c8—2c10—HC3—ground. (2)—A lifting circuit as follows:—trolley—MC—TW1—MR1—LMR—LC1—3c11—M3—5c3—5c10—LC3—4c3—3c12—LC4—1c12—M12—2c3—M3—3c4—LC6—1c4—M4—3c6—LC8—1c6—M6—ground. This leaves the coils of C1 and C3 excited in conjunction, C4, C6, and C8 excited in opposition, and C10, C11, and C12 shunted out. C1 and C3 thereupon close, putting the motors in series with all resistances in. The closing of C3, followed by a stroke of the master relay, changes the above lifting circuit similarly to the corresponding change in the operation of Fig. 1 so that the coils of C4 become excited in conjunction and C4 closes, shunting R1. Thereafter C6 and C8 close in succession subject to the action of the interlocks, the master relay, and the auxiliary arresting magnets just as in Fig. 1. The interlocks on C8 change both holding and lifting circuits in part so that C11 and C12 are shunted out and C10 is excited, subject as usual to the control of MR and M8. When C10 closes its interlocks shunt the coils of C3. C3 then opens and its interlocks put the coils of C4 into opposition. C4 then opens and similarly in order, C6 and C8. With C10 closed and C8 open their interlocks permit C11 to close. The interlocks of C11 shunt out C10 and C3, and C10 opens. With C11 closed, C10 open, and C8 open their interlocks permit C12 to close. Now the motors are in parallel with all resistances in. Next C12 with M12 and MR control C4 just as C3 did in the series steps, C4 again controls C6, and C6 again controls C8. With C8 closed the motors are in parallel with all resistances shunted out. Thereupon the interlocks of C3—open and C8—closed connect TW2 to TW4, shunting out LMR and stopping further action of the master relay. Placing MC in positions 1 or 2 modifies these actions just as in Fig. 1, stopping the progression at any step, or allowing it to go on as may be desired.

Fig. 2 shows a convenient construction for a typical reversing interlock. The parts marked F are insulating strips of fiber, those marked B are brass bars, and those marked S are flat springs so bent that they tend to contact, S1 and S2 with B1, S3 and S4 with B2, and S5 away from B3. M4 is the auxiliary magnet with its armature fastened to S5. FR is an insulating rod or frame carrying cross pins, P, and connected to the armature lever of the contactor directly or by links. FR, when down, permits S1 to contact with B1 and S3 with B2, and pushes S2 from B1, S4 from B2, and S5 into contact with B3 through the armature and pole pieces of M4. FR when up pushes S1 from B1 and S3 from B2, permits S2 to contact with B1 and S4 with B2, and allows S5 to spring away with the armature from B3 whenever the current through M4 is broken. M4, when excited, can hold its armature against the spring of S5, but once the armature is released M4 cannot attract it back. It must be pushed back by pin P. The three long through-screws hold all together rigidly and are bushed with fiber tubing from contact with the bars and springs, excepting those into which they are shown threaded. In this way the left screw connects B1 and B3 electrically, the middle screw, threaded into B5, forms a terminal for S2 and S3, while the right screw threaded into B6 forms a terminal for S1, S4, and S5. One terminal of the coil of M4 is connected to B3.

With FR down the circuit is:—B2—S3—contactor coil—S1—B1—B3—M4. With FR up and armature held by M4 the circuit is:—B2—S4—S5—B3—M4. With FR up and armature released the circuit is B2—S4—contactor coil—S2—B1—B3—M4. In the first and last cases the coil is oppositely excited. In the second case it is short-circuited. Any other construction known to those skilled in the art might be used for the interlocks as seems desirable, and the skilled electrician can modify the parts of the apparatus and change the arrangement of the circuits in many ways without conflicting with the principle of my invention as defined in the claims.

I claim:—

1. In a control system for electric motors, the combination of a group of two coil electromagnets, switches operated thereby for controlling the motor circuits, control circuits, means for placing the coils of said electromagnets in electromagnetic opposition, and means including interlocking switches for placing the coils of said electromagnets successively in electromagnetic conjunction to secure progressive action of the magnets through a predetermined series of steps.

2. In a control system for electric motors the combination of a group of two - coil, main electromagnets for controlling the motor circuits with interlocking devices for securing the successive action of the main electromagnets, and with auxiliary magnets to arrest the operation of said interlocks and thereby separate the successive steps of the main magnets by greater or smaller periods of time as desired, with the necessary circuits and contacts to secure said actions, and with a master controller for controlling the action of the interlocks and auxiliary magnets substantially as described.

3. In a control system for electric motors the combination of a group of two-coil, main electromagnets with means for causing the same to act in a definite cycle of steps, including interlocking devices, auxiliary arresting magnets, and a master relay adapted to periodically make and break circuits made up of one coil from each main magnet, the relay's own operating coil, and the coils of the auxiliary arresting magnets, the breaking and remaking of these circuits causing the auxiliary magnets to permit an additional step in the cycle of the main switch group, with a master controller for determining the number of steps to be taken at a time, and with the necessary circuits and contacts substantially as described.

4. In a control system for electric motors the combination of a group of two-coil, main electromagnets with a periodically acting master relay, with means whereby the action of said relay may be temporarily arrested when the main motor current is above a certain value, thereby arresting the progression of the main magnets, with means whereby a change in the main motor current allows the relay to resume its periodic action, with interlocking devices and auxiliary arresting magnets controlling the steps of the main magnets, with a master controller for determining the number of steps to be taken at a time, and with the necessary circuits and contacts for securing said actions substantially as described.

5. In a control system for electric motors the combination of a group of two-coil, main electromagnets with interlocks, auxiliary arresting magnets, and a master controller for controlling the steps of the main magnets, and with a periodically acting master relay with means whereby its intermittent action causes the main magnets to take a series of steps in order, with means whereby said periodic action is temporarily arrested by a rise in the motor current to a predetermined value, thereby arresting the cycle of the main magnets, with means whereby said periodic action is resumed when the motor current falls to a predetermined value, and with the necessary circuits and contacts substantially as described.

6. In a control system for electric motors the combination of a group of electromagnetic contactors with a master relay whose periodic action causes the contactors to pass through a cycle of steps, means whereby said periodic action may be arrested by a rise in the main motor current to any one of several values and afterward resumed on the reduction of said current to any one of several values, with a switch and rheostat in the circuit of the holding coil of the master relay whose setting determines the value of motor current at which above actions take place, and with the necessary circuits and contacts for securing the above actions substantially as described.

7. In a control system for electric motors the combination of a main group of electromagnets with controlling interlocks, auxiliary arresting magnets, a master controller, and a master relay for controlling the main magnets both as to the order and speed with which they pass through a series of steps, with means for arresting the action of the master relay at any desired step in the progression of the main magnets by devices reducing the strength of the operating coil of the master relay, and with the necessary circuits for securing the above actions substantially as described.

8. In a control system for electric motors the combination of a main group of electromagnets with controlling interlocks, auxiliary arresting magnets, a master controller, and a master relay for controlling the main magnets both as to the order and speed with which they pass through a series of steps, with means for arresting the progression of the main magnets at any desired step by devices maintaining the action of the auxiliary arresting magnets independently of the action of the rest of the control, and with the necessary circuits and contacts substantially as described.

In testimony whereof I have hereunto set my hand.

EUGENE C. WOODRUFF.

Witnesses:
J. O. KAMMERMAN,
GEO. F. ECKHARD.